United States Patent
Shearer et al.

(10) Patent No.: US 8,371,526 B2
(45) Date of Patent: Feb. 12, 2013

(54) AIRCRAFT HEATER FLOOR PANEL

(75) Inventors: Jon D. Shearer, Hartville, OH (US); Nathan Pisarski, Stow, OH (US)

(73) Assignee: Goodrich Corporation, Charlotte, NC (US)

( * ) Notice: Subject to any disclaimer, the term of this patent is extended or adjusted under 35 U.S.C. 154(b) by 1527 days.

(21) Appl. No.: 11/470,641

(22) Filed: Sep. 7, 2006

(65) Prior Publication Data
US 2007/0158501 A1    Jul. 12, 2007

Related U.S. Application Data

(60) Provisional application No. 60/758,334, filed on Jan. 12, 2006.

(51) Int. Cl.
B64C 1/00 (2006.01)
B64C 30/00 (2006.01)

(52) U.S. Cl. .................... 244/117 R; 52/220.2; 219/213

(58) Field of Classification Search .............. 244/117 R, 244/129.1, 133; 52/220.2; 219/213
See application file for complete search history.

(56) References Cited

U.S. PATENT DOCUMENTS

| | | | |
|---|---|---|---|
| 3,020,379 A * | 2/1962 | Ludlow et al. ................ | 392/435 |
| 3,697,728 A * | 10/1972 | Stirzenbecher ............... | 219/548 |
| 4,291,079 A | 9/1981 | Hom .............................. | 428/116 |
| 4,310,745 A * | 1/1982 | Bender ......................... | 219/213 |
| 4,598,007 A | 7/1986 | Kourtides et al. ............ | 428/116 |
| 5,851,336 A | 12/1998 | Cundiff et al. ............. | 156/272.2 |
| 6,611,659 B2 * | 8/2003 | Meisiek ........................ | 392/435 |
| 6,691,923 B2 | 2/2004 | Shearer ......................... | 236/78 |
| 6,776,222 B2 * | 8/2004 | Seki et al. ....................... | 165/56 |
| 6,834,159 B1 * | 12/2004 | Schramm ...................... | 392/435 |
| 2005/0098684 A1 * | 5/2005 | Gullerud et al. ........... | 244/129.1 |
| 2005/0150968 A1 * | 7/2005 | Shearer ......................... | 236/94 |

FOREIGN PATENT DOCUMENTS

| | | |
|---|---|---|
| EP | 1 046 576 | 10/2000 |
| JP | 56056540 | 10/1979 |
| JP | 58217130 | 12/1983 |
| JP | 61011532 | 1/1986 |
| JP | 07032518 | 2/1995 |

OTHER PUBLICATIONS

PCT/US00/24874; International Search Report mailed Dec. 15, 2000.
Extended Search Report on European Patent Application No. 06122006.7—issued Nov. 24, 2011.
EPO Patent Abstracts of Japan—JP 56056540.
EPO Patent Abstracts of Japan—JP 61011532.
EPO Patent Abstracts of Japan—JP 58217130.

* cited by examiner

*Primary Examiner* — Philip J Bonzell
(74) *Attorney, Agent, or Firm* — Cindy Murphy LLC

(57) ABSTRACT

An aircraft heated floor panel (10) comprising a heat-generating layer (20) including an electric heater (52) having current supply lines (54) and a controller (60) which controls the current supplied to the heater (52) via the supply lines (54) to thereby control the heat generated by the layer (20). The controller (60) is integrated into the floor panel (10) whereby the panel has a stand-alone control system which need only be connected to the on-board power source of the aircraft, but can be connected to a main controller for networking or other purposes.

20 Claims, 3 Drawing Sheets

AIRCRAFT HEATER FLOOR PANEL

RELATED APPLICATION

This application claims priority under 35 U.S.C. §119(e) to U.S. Provisional Patent Application No. 60/758,334 filed on Jan. 12, 2006. The entire disclosure of this earlier provisional application is hereby incorporated by reference.

FIELD OF THE INVENTION

This invention relates generally to an aircraft floor panel and, more particularly, to a floor panel for installation in an area of an aircraft that is to be heated during flight.

BACKGROUND OF THE INVENTION

An aircraft will commonly include a heating system in order to maintain the cabin at a comfortable temperature during flight. The floor of the aircraft is a particular area of concern whereby heater floor panels often are part of an aircraft's heating system. An aircraft heater floor panel can comprise a heat-generating layer including an electric heater having a current line for providing power to the heater. An aircraft typically has a plurality of heated floor panels and they are usually all connected to the same controller located in the cockpit of the aircraft. A sensor in or near the heat-generating layer provides panel temperature data to the controller and, based on this data, the controller regulates the amount of current supplied to the electric heater. Optionally, an ambient sensor can be used to provide temperature data to the controller to allow for closed-loop temperature control in the cabin. Additionally or alternatively, the controller can be connected to switch located outside the cockpit (e.g., the galley) to allow manual selection of power levels and/or temperature setpoints.

SUMMARY OF THE INVENTION

The present invention provides an aircraft heated floor panel having an integrated controller. The panel may operate as part of a stand-alone control system which need only be connected to the on-board power source. Additionally or alternatively, the panels may be combined or networked in combination with a main and/or sub-controller. The present invention reduces and/or eliminates dependency on an aircraft power distribution unit and/or centralized control as each panel is capable of providing localized control via its integrated controller. Moreover, the ability to accommodate growth and/or operational flexibility, should panel needs grow or change, is enhanced by the integrated design of the present invention.

These and other features of the invention are fully described and particularly pointed out in the claims. The following descriptive annexed drawings set forth in detail a certain illustrative embodiment of the invention, this embodiment being indicative of but one of the various ways in which the principles of the invention may be employed.

DRAWINGS

DETAILED DESCRIPTION

Figure 1:
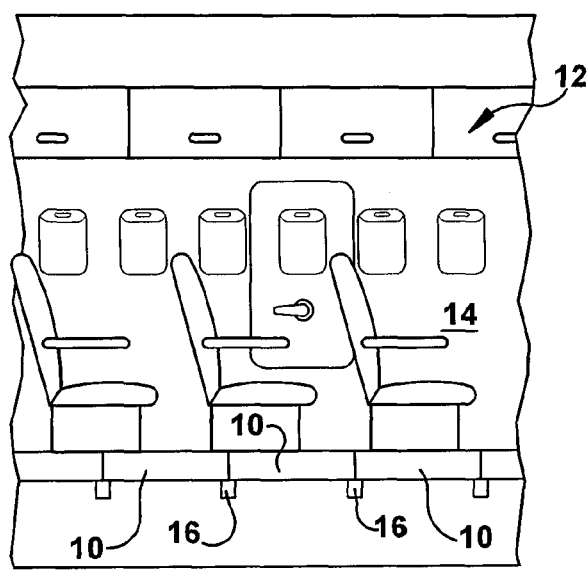
FIG. 1 is a schematic perspective view of aircraft floor panels according to the present invention installed in an aircraft.

Referring now to the drawings, and initially to FIG. 1, a plurality of aircraft floor panels 10 according to the present invention are shown installed in an aircraft 12. The floor panels 10 are provided in order to maintain an area 14 (e.g., the cabin) at a comfortable temperature and, to this end, are heated floor panels. The aircraft 12 includes structural members 16 below the area 14 by which the panels 10 are supported.

Figure 2:
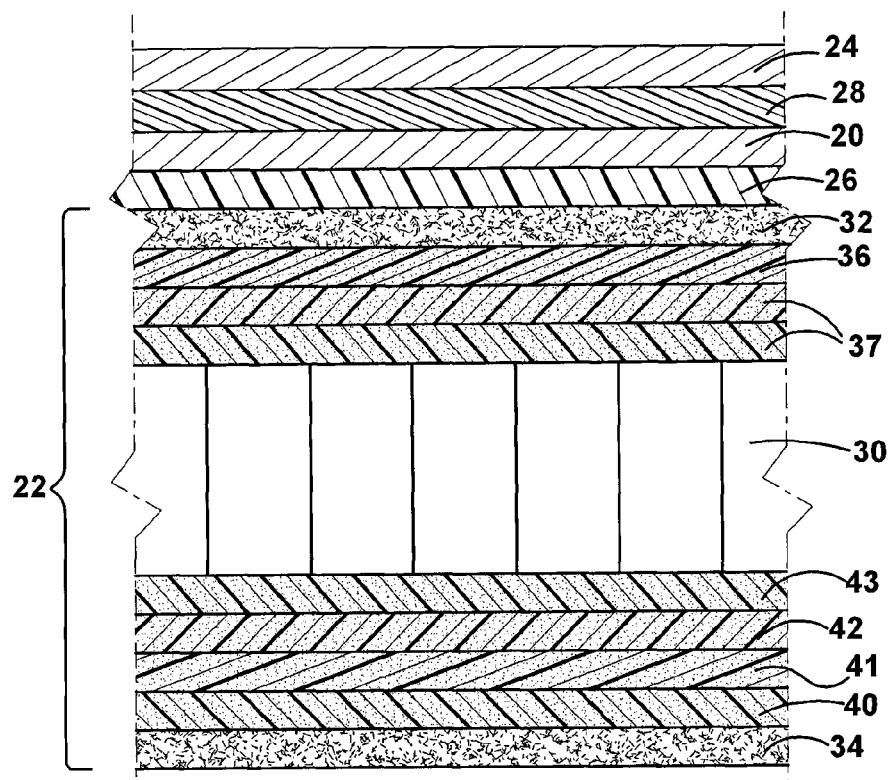
FIG. 2 is a cross-sectional view of one of the aircraft floor panels.

Referring now to FIG. 2, one of the aircraft floor panels 10 is shown in detail. The panel 10 comprises a heat-generating layer 20 and, in the illustrated embodiment, also includes a support level 22, and a cover layer 24. An adhesive layer 26 may be situated between the support level 22 and the heat-generating layer 20, and an adhesive layer 28 may be situated between the heat-generating layer 20 and the cover layer 24.

The support level 22 is mounted to the aircraft structural members 16 below the area 14. The support level 22 can comprise a honeycomb layer 30, upper and lower layers 32 and 34, and sandwiching layers 36-39 and 40-43. The upper and lower layers 32 and 34 can each comprise a prepreg layer, that is a fiber reinforced polymer layer formed of a plurality of filamentary materials (e.g., fiberglass, carbon, aramid) in a matrix of thermoset polymeric material (e.g., phenolic, epoxy). For example, the layers 32 and 42 can comprise fiberglass/phenolic prepreg layers. The sandwiching layers 36-39 and 40-34 can also each comprise prepreg layers, such as carbon/epoxy prepreg layers.

The cover layer 24 forms the upper surface of the panel 10 and thus must be able to receive (and resist) impacts caused by floor traffic in the area 14. The cover layer 24 can comprise, for example, a thin sheet of aluminum or titanium. If the cover material is thermally conductive (as would be the case with aluminum and/or titanium), the layer 24 can also function as a heat-distributing layer.

The adhesive layers 26 and 28 can each comprise a film adhesive (e.g., epoxy) capable of withstanding elevated curing temperatures such as, for example, the epoxy film adhesive sold as AF-126 from 3M. The adhesive layer 26/28 may incorporate a scrim (not shown) if necessary or desired for adhesive-spreading purposes.

Figure 3:
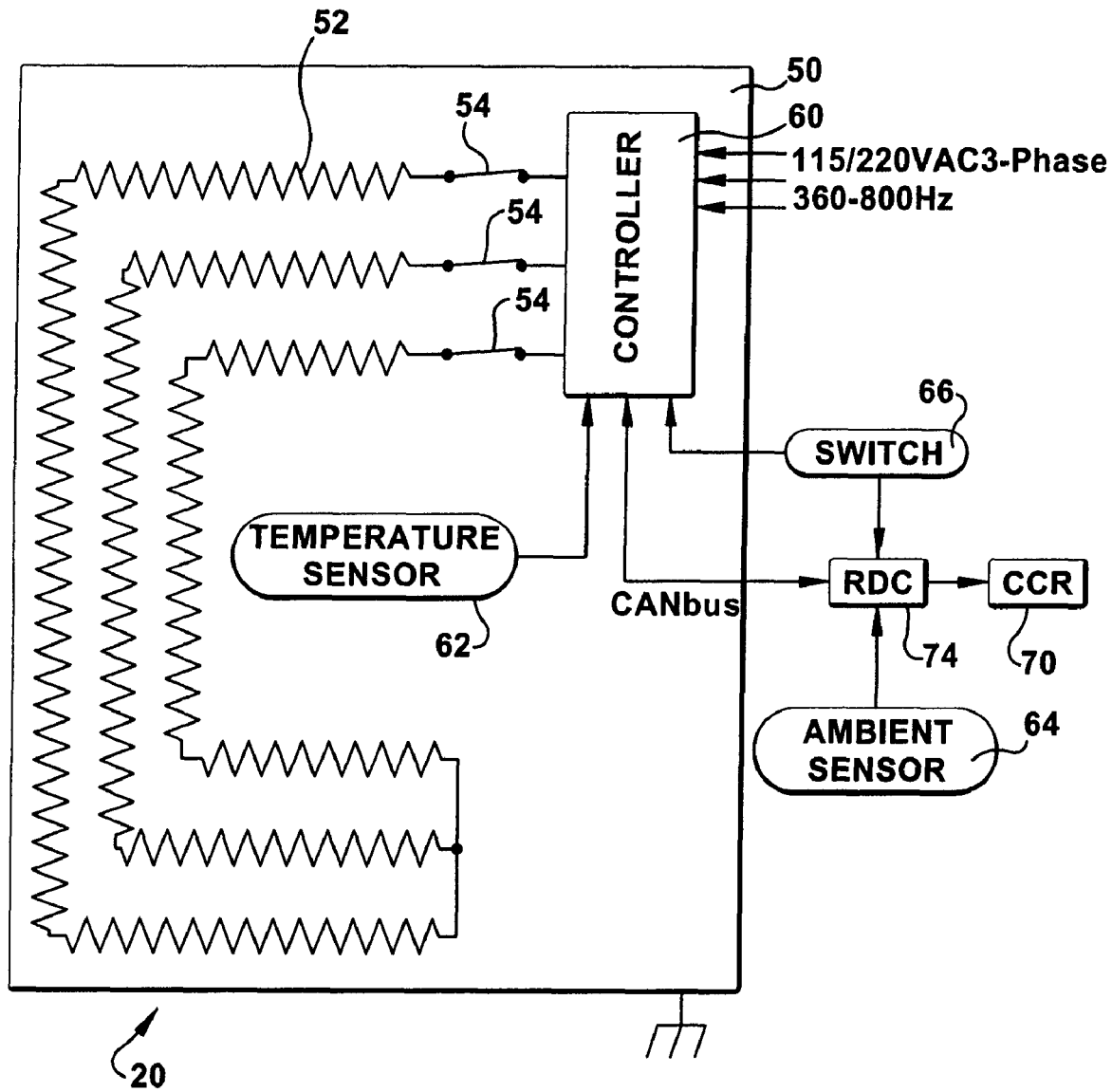
FIG. 3 is a schematic illustration of a heat-generating layer of the aircraft floor panel.

Turning now to the heat-generating layer 20, it is shown in more detail in FIG. 3. The layer 20 comprises a dielectric base material 50 and an electric heater 52 encapsulated therein. The heater 52 may be an etched foil type element or a resistance wire element made of an electrically conductive material (e.g., metal). In any event, the heater 52 has current lines 54 connected to a controller 60. In the illustrated embodiment, the heater 52 has three current lines 54 connected respectively to three heating elements. A multi-element arrangement such as this allows switch selection of different power level settings (e.g., high, medium, low). That being said, a heater 52 with a single heating element and/or a single current line is certainly possible with and contemplated by the present invention.

According to the present invention, a controller 60 is integral to the floor panel 10 and, in the illustrated embodiment, integral to the heat-generating level 20. The panel-integrated controller 60 can be of any suitable configuration, such as that shown in U.S. Patent Application Publication US 2005/0150968. The invention disclosed in this publication is assigned to the assignee of the present invention and its entire disclosure is hereby incorporated by reference.

The panel 10, via the controller 60, receives electrical power from an on-board power supply (not shown). The power preferably is 3-phase AC power, but could instead be single phase AC power. Alternatively, the panel 10 can be designed to receive DC power.

A sensor 62, in or near the heat generating level 20, provides panel temperature data to the controller 60 and, based on this data, the panel-integrated controller 60 regulates the amount of current supplied to the electric heater 52. An ambient sensor 64 can also be used to provide temperature data to the panel-integrated controller 60 to allow for closed-loop temperature control in the cabin. The sensor 64 is situated, for example, in the area 14 of the cabin. Although not specifically shown in the drawing, an overheat-prevention device can be provided as a precaution against temperature sensor and/or controller malfunction.

The panel-integrated controller 60 can be connected to a switch 66 which, for example, is accessible by flight crew members (e.g., in the galley) to allow manual selection of power levels (e.g., low, medium, high) and/or temperature set-points. In the exemplary embodiment, the switch 66 has an output connected to the panel-integrated controller 60 for indicating the desired heating power. For example, if a flight crew member switches the switch 66 to select either off, low, medium or high power, the panel-integrated controller 60 may be configured to activate none, one, some or all of the heating elements via their respective current lines 54.

Figure 4:
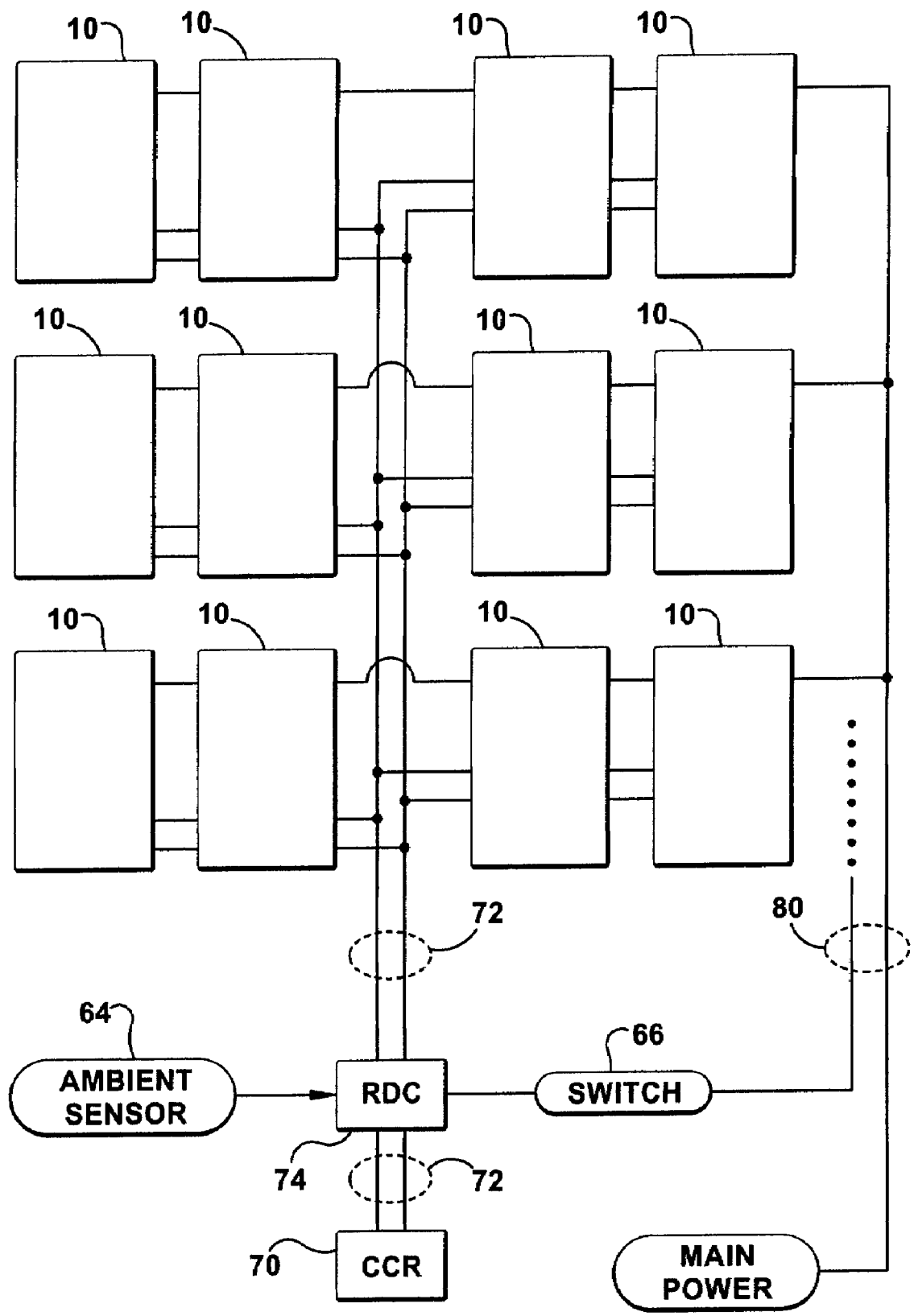
FIG. 4 is a schematic illustration of the connection and/or control of a plurality of the floor panels on the aircraft.

As shown in FIG. 4, a plurality of panels 10 on the aircraft 12 can be networked and/or connected to a main controller 70 via a control-data bus 72. The control-data bus 72 may be a CANbus or any other type of control-data bus.

In the illustrated embodiment, the main controller 70 communicates with the integrated controller 60 of each panel 10 through a secondary controller 74. As shown in FIG. 3, each panel 10 can be associated with its own ambient sensor 64, power level switch 66 and/or secondary controller 74. Alternatively, as shown in FIG. 4, all of the panels 10 could share the same sensor 64, switch 66 and/or secondary controller 74, and they could be coupled to the main power source via a power/switching bus 80. Although not specifically shown in the drawings, the floor panels 10 within the aircraft may be defined within different zones, with each zone having its own ambient temperature sensor 64, switch 66 and/or secondary controller 74.

The main controller 70 can, for example, use a primary temperature control algorithm to provide temperature set-points to the panel-integrated controller 60. In the exemplary embodiment, the secondary controller 74 receives the switch status information from the switch 66 and temperature data from the ambient sensor 64. The secondary controller 74 provides such information to the main controller 70 so that overall temperature control may be carried out via information (control set-points, fault detections, etc.) communicated between the main controller 70 and the panel-integrated controller 60.

The panel-integrated controllers 60 can each be configured to provide local temperature information (via their sensors 62) to the main controller 70. The main controller 70 can process this local temperature data, along with data from the ambient temperature sensor(s) 64, and then provide a desired temperature profile in different locations in the aircraft. For example, the main controller 70 can initially provide temperature set-point information to each of the floor panels 10. Based on the temperature values obtained by the ambient temperature sensors 64 received, the main controller 72 can provide revised set-point temperature information to some or all of the floor panels 10 in the affected location(s).

The panel-integrated controllers 60 can be also be configured to provide set point temperature values, fault information, and other health/maintenance information to the main controller 70. In the event the main controller 70 receives fault information from a given panel 10, the main controller 70 may deactivate the faulty panel. In addition, the main controller 70 may provide revised control information (e.g., new temperature set-points, power levels, etc) to one or more floor panels 10 in the vicinity of the faulty panel 10 in order to compensate for the faulty panel.

One may now appreciate that the present invention provides a heated floor panel with an integrated controller. Although the invention has been shown and described with respect to a certain preferred embodiment, it is obvious that equivalent and obvious alterations and modifications will occur to others skilled in the art upon the reading and understanding of this specification. The present invention includes all such alterations and modifications and is limited only by the scope of the following claims.

The invention claimed is:

1. An aircraft heated floor panel comprising:
   a heat-generating layer including an electric heater having current supply lines;
   a support level, positioned below the heat-generating layer, for supporting the panel on structural members of the aircraft; and
   a controller which controls the current supplied to the heater via the lines to thereby control the heat generated by the layer; and
   a sensor providing temperature data to the controller;
   wherein the controller is integrated into the support level and/or the heat-generating layer whereby it is a panel-integrated controller; and
   wherein the panel-integrated controller regulates the electric heater based on the temperature data.

2. An aircraft heated floor panel as set forth in claim 1, wherein the support level comprises a honeycomb layer.

3. In combination, an aircraft and at least one aircraft floor panel as set forth in claim 1, installed in an area of the aircraft.

4. An aircraft heated floor panel as set forth in claim 1, wherein the sensor is in or near the heat-generating layer, and wherein the controller regulates the amount of current supplied to the electric heater.

5. An aircraft heated floor panel as set forth in claim 4, wherein the heater comprises a plurality of heating elements each having a current line connected to the panel-integrated controller, and wherein power can be supplied to none, one, some, or all of the heater elements to control the heat output of the heater.

6. An aircraft heated floor panel as set forth in claim 4, wherein the panel-integrated controller is connected to a switch allowing selection of power levels and/or temperature set-points.

7. An aircraft heated floor panel as set forth in claim 6, wherein the heater comprises a plurality of heating elements each having a current line connected to the panel-integrated controller, and wherein power can be supplied to none, one, some, or all of the heater elements to control the heat output of the heater.

8. An aircraft heated floor panel as set forth in claim 4, and an ambient sensor that provides temperature data to the panel-integrated controller and, wherein, based on this data, the controller regulates the amount of current supplied to the electric heater.

9. An aircraft heated floor panel as set forth in claim 8, wherein the panel-integrated controller is connected to a switch allowing selection of power levels and/or temperature set-points.

10. An aircraft heated floor panel as set forth in claim 8, wherein the heater comprises a plurality of heating elements each having a current line connected to the panel-integrated controller, and wherein power can be supplied to none, one, some, or all of the heater elements to control the heat output of the heater.

11. An aircraft heated floor panel as set forth in claim 1, and an ambient sensor that provides temperature data to the panel-integrated controller and, wherein, based on this data, the controller regulates the amount of current supplied to the electric heater.

12. An aircraft heated floor panel as set forth in claim 11, wherein the panel-integrated controller is connected to a switch allowing selection of power levels and/or temperature set-points.

13. An aircraft heated floor panel as set forth in claim 1, wherein the panel-integrated controller is connected to a switch allowing selection of power levels and/or temperature set-points.

14. An aircraft heated floor panel as set forth in claim 13, wherein the heater comprises a plurality of heating elements each having a current line connected to the panel-integrated controller, and wherein power can be supplied to none, one, some, or all of the heater elements to control the heat output of the heater.

15. In combination, an aircraft, a plurality of aircraft floor panels as set forth in claim 1, installed in an area of the aircraft, and a main controller connected with each of the panel-integrated controllers.

16. The combination set forth in claim 15, wherein the panel-integrated controllers are connected to the main controller via control-data bus.

17. The combination set forth in claim 15, wherein an ambient sensor provides temperature data to the main controller.

18. The combination set forth in claim 15, wherein a switch connected to the main controller allows selection of power levels and/or temperature set-points.

19. An aircraft heated floor panel comprising:
a heat-generating layer including an electric heater having current supply lines;
a support level, positioned below the heat-generating layer, for supporting the panel on structural members of the aircraft;
a controller which controls the current supplied to the heater via the lines to thereby control the heat generated by the layer;
wherein the controller is integrated into the support level and/or the heat-generating layer;
wherein the controller is connected to a switch allowing selection of power levels and/or temperature set-points.

20. An aircraft heated floor panel comprising:
a heat-generating layer including an electric heater having current supply lines;
a support level, positioned below the heat-generating layer, for supporting the panel on structural members of the aircraft;
a controller which controls the current supplied to the heater via the lines to thereby control the heat generated by the layer;
wherein the controller is integrated into the support level and/or the heat-generating layer;
wherein the heater comprises a plurality of heating elements each having a current line connected to the controller, and wherein power can be selectively supplied to none, one, some, and all of the heater elements to control the heat output of the heater.

* * * * *